US011862979B1

(12) United States Patent
Ali et al.

(10) Patent No.: US 11,862,979 B1
(45) Date of Patent: Jan. 2, 2024

(54) TRIPLE-FUNCTION BATTERY ENERGY STORAGE SYSTEM FOR HYBRID MICROGRID SYSTEM

(71) Applicants: Mohd Hasan Ali, Germantown, TN (US); Morteza Davirankeshararzi, Memphis, TN (US)

(72) Inventors: Mohd Hasan Ali, Germantown, TN (US); Morteza Davirankeshararzi, Memphis, TN (US)

(*) Notice: Subject to any disclaimer, the term of this patent is extended or adjusted under 35 U.S.C. 154(b) by 0 days.

(21) Appl. No.: 17/068,679

(22) Filed: Oct. 12, 2020

Related U.S. Application Data

(60) Provisional application No. 62/914,295, filed on Oct. 11, 2019.

(51) Int. Cl.
*H02J 3/32* (2006.01)
*H02J 3/38* (2006.01)

(52) U.S. Cl.
CPC .............. *H02J 3/32* (2013.01); *H02J 3/381* (2013.01); *H02J 3/388* (2020.01); *H02J 2300/10* (2020.01); *H02J 2300/24* (2020.01); *H02J 2300/28* (2020.01); *H02J 2300/40* (2020.01)

(58) Field of Classification Search
CPC ....... H02J 3/28–322; H02J 3/381; H02J 3/388
See application file for complete search history.

(56) References Cited

U.S. PATENT DOCUMENTS

2008/0212343 A1* 9/2008 Lasseter .................. H02J 3/386
363/39

2014/0152110 A1* 6/2014 Sugimoto ................ H02J 3/46
307/66

(Continued)

FOREIGN PATENT DOCUMENTS

CN 104485689 A * 4/2015
CN 108565880 A * 9/2018

OTHER PUBLICATIONS

Jianwei Li, Rui Xiong, Qingqing Yang, Fei Liang, Min Zhang, Weijia Yuan, "Design/test of a hybrid energy storage system for primary frequency control using a dynamic droop method in an isolated microgrid power system", Oct. 31, 2016, Applied Energy, vol. 201, p. 257-269. (Year: 2016).*

(Continued)

*Primary Examiner* — Rexford N Barnie
*Assistant Examiner* — David A Shiao
(74) *Attorney, Agent, or Firm* — Wayne Edward Ramage; Baker Donelson

(57) ABSTRACT

An improved "3-in-1" BESS that performs three functions: (1) improving the transient stability in a hybrid AC/DC microgrid (HMG) system during any fault; (2) improving power quality in the HMG during any sudden load change; and (3) mitigating power and frequency fluctuations due to variations in wind speed and solar irradiance in the HMG. The same control and structural design is used for all three functions, and the improved BESS thus is adaptive to the changing operating situations within the HMG, and eliminates the requirement for a number of higher cost auxiliary control devices. The control structure of the improved BESS is simple, so it is easier and cheaper to manufacture, and can be easily implemented in practice, and retro-fit into existing HMGs.

7 Claims, 10 Drawing Sheets

(56) References Cited

U.S. PATENT DOCUMENTS

2016/0087475 A1* 3/2016 Kang .................. H02J 3/32
320/128
2019/0334352 A1* 10/2019 Sugimoto ................ H02J 3/38

OTHER PUBLICATIONS

J. M. Guerrero, P. C. Loh, T. Lee and M. Chandorkar, "Advanced Control Architectures for Intelligent Microgrids—Part II: Power Quality, Energy Storage, and AC/DC Microgrids," Apr. 2013, in IEEE Transactions on Industrial Electronics, vol. 60, No. 4, pp. 1263-1270. (Year: 2013).*
I. Serban and C. Marinescu, "Control Strategy of Three-Phase Battery Energy Storage Systems for Frequency Support in Microgrids and with Uninterrupted Supply of Local Loads," Sep. 2014, in IEEE Transactions on Power Electronics, vol. 29, No. 9, pp. 5010-5020. (Year: 2014).*
Mohammad H. Moradi, Mohsen Eskandari, S. Mahdi Hosseinian, "Cooperative control strategy of energy storage systems and micro sources for stabilizing microgrids in different operation modes", Jun. 2016, International Journal of Electrical Power & Energy Systems, vol. 78, pp. 390-400. (Year: 2016).*
M. D. Keshavarzi and M. H. Ali, "FRT Capability Enhancement of Autonomous AC/DC Hybrid Microgrid by Coordinated MSDBR and Interlinking Converter Control Strategy," Feb. 18, 2019, 2019 IEEE Power & Energy Society Innovative Smart Grid Technologies Conference (ISGT), 2019, pp. 1-5. (Year: 2019).*
A. Milczarek, M. Malinowski and J. M. Guerrero, "Reactive Power Management in Islanded Microgrid—Proportional Power Sharing in Hierarchical Droop Control," Feb. 13, 2015, in IEEE Transactions on Smart Grid, vol. 6, No. 4, pp. 1631-1638. (Year: 2015).*
K. Shi, H. Ye, W. Song and G. Zhou, "Virtual Inertia Control Strategy in Microgrid Based on Virtual Synchronous Generator Technology," May 23, 2018, in IEEE Access, vol. 6, pp. 27949-27957, 2018. (Year: 2018).*
J. Quesada, R. Sebastián, M. Castro, J.A. Sainz, "Control of inverters in a low-voltage microgrid with distributed battery energy storage. Part II: Secondary control", Sep. 2014, Electric Power Systems Research, vol. 114, 2014, pp. 136-145. (Year: 2014).*
I. Serban, C. Marinescu, "Battery energy storage system for frequency support in microgrids and with enhanced control features for uninterruptible supply of local loads", Jan. 2014, International Journal of Electrical Power & Energy Systems, vol. 54, p. 432-441. (Year: 2014).*

* cited by examiner

Power circuit with control signals

Table 1 - Microgrid System Parameters

| DFIG | | | |
|---|---|---|---|
| Rated Power | 1.67 MVA | Turbine inertia constant | 4.32 |
| Rated Voltage | 575 V | Shaft spring constant | 1.11 |
| Stator $R_s, L_s$ | 0.023, 0.18 pu | Shaft mutual damping | 1.5 |
| Rotor $R'_r, L'_r$ | 0.016, 0.16 pu | DC Link Capacitor | 10 mF |
| Inertia constant | 0.685 s | Rated DC link Voltage | 1150 V |
| Friction factor | 0.01 pu | Pole pairs | 3 |

| PV | | | |
|---|---|---|---|
| Module | SunPower | Model: SPR-315E-WHT-D | |
| Parallel strings | 128 | Series modules per string | 8 |

| DG | | | |
|---|---|---|---|
| Rated Power: | 800 KVA | $X_d, X_q$ | 2.59, 2.36 pu |
| Rated Voltage | 460 V | Inertia constant, Friction | 0.1716s, 0.0133pu |
| Stator Resistance $R_s$ | 0.014 pu | Pole pairs | 2 |

| AC BESS | | | |
|---|---|---|---|
| Full charge Voltage | 1105 V | AC Filter: $R_f, L_f, C_f$ | 1.9mΩ, 0.5mH, 250μF |
| Rated Capacity | 500 Ah | DC link Voltage, Capacitor | 1100V, 5mF |
| | | VSC carrier frequency | 5KHz |

| DC BESS | | | |
|---|---|---|---|
| Rated Voltage | 680 V | Rated Capacity | 150 Ah |

| IC | | | |
|---|---|---|---|
| DC Voltage, $C_{DC}$ | 800V, 50 mF | VSC carrier frequency | 5KHz |
| AC Filter: $R_f, L_f, C_f$ | 1.9mΩ, 0.5mH, 2500μF | | |

| HMG Loads and Lines | | | |
|---|---|---|---|
| Base Voltage ($V_{AC}$) | 4.16 KV | Load 1,2,3 | 0.57pu, PF=0.83 |
| Base Power | 1MVA | System frequency | 60 Hz |
| L1 L2 L3 | 1.9 1.3 1.9 mH | R1, R2, R3 | 0.2 0.1384 0.2 Ω |

FIG. 4

TRIPLE-FUNCTION BATTERY ENERGY STORAGE SYSTEM FOR HYBRID MICROGRID SYSTEM

This application claims benefit of and priority to U.S. Provisional App. No. 62/914,295, filed Oct. 11, 2019, which is incorporated herein in its entirety by specific reference for all purposes.

FIELD OF INVENTION

This invention relates to a battery energy storage system (BESS). More particularly, the present invention relates to a three-in-one BESS that performs three functions with relation to a hybrid AC/DC microgrid (HMG) system.

SUMMARY OF INVENTION

In various exemplary embodiments, the present invention comprises an improved "3-in-1" BESS that performs three functions: (1) improving the transient stability in a hybrid AC/DC microgrid (HMG) system during any fault; (2) improving power quality in the HMG during any sudden load change; and (3) mitigating power and frequency fluctuations due to variations in wind speed and solar irradiance in the HMG.

The same control and structural design is used for all three functions, and the improved BESS thus is adaptive to the changing operating situations within the HMG, and eliminates the requirement for a number of higher cost auxiliary control devices. The control structure of the improved BESS is simple, so it is easier and cheaper to manufacture, and can be easily implemented in practice, and retro-fit into existing HMGs.

BRIEF DESCRIPTION OF THE DRAWINGS

FIG. 4 shows microgrid system parameters for the system of FIG. 3.

DETAILED DESCRIPTION OF EXEMPLARY EMBODIMENTS

Microgrids and smart grids are gradually evolving from conventional power systems. In microgrids, interconnected sub-grids govern power distribution with high penetration of renewable energy resources and energy storage systems. In a hybrid AC/DC microgrid (HMG) system, operational functionalities of both AC (alternating current) and DC (direct current) currents are made available in order to avoid frequent conversions (i.e., from AC to DC and from DC to AC) so as to minimize energy losses and also to feed DC loads directly. Microgrids typically comprise a combination of distributed energy resources or assets (DER), such as, but not limited to, a combined heat-and-power system, solar panels, wind-generators or turbines, fuels cells, and energy storage (e.g., a battery energy storage system, or BESS). In a microgrid, a battery energy storage system (BESS) is used mainly for peak shaving (i.e., the process of reducing the amount of energy purchased or obtained from a utility company during peak demand hours by using an alternative localized power source), and for minimization of frequency and power fluctuations resulting from solar irradiance variation or wind speed change (for solar or wind-based energy sources). DER are managed by a microgrid controller and a network of auxiliary control devices to help achieve grid resiliency, which generally encompasses reducing and coping with power outages efficiently, lessening the impact of an outage, and regrouping from an outage quickly.

In the event of a utility grid outage, the microgrid will safely disconnect to "island" from the grid, support critical loads in the microgrid, and then reconnect when the outage event has been corrected (i.e., grid-connected mode). Improving resiliency and transient stability during large signal disturbances in an "islanded" HMG comprising different DER is a challenging task. Typically, in prior art system, auxiliary control devices such as a series dynamic braking resistor (SDBR), fault current limiters, and the like, are used to improve the transient stability of the HMG system, which incur higher additional costs.

In several embodiments, the present invention comprises an improved "3-in-1" BESS that performs three functions: (1) improving the transient stability in the HMG during any fault; (2) improving power quality in the HMG during any sudden load change; and (3) mitigating power and frequency fluctuations due to variations in wind speed and/or solar irradiance in the HMG.

The same control and structural design is used for all three functions, and the improved BESS thus is adaptive to the changing operating situations within the HMG, and eliminates the requirement for a number of higher cost auxiliary control devices. The control structure of the improved BESS is simple, so it is easier and cheaper to manufacture, and can be easily implemented in practice, and retro-fit into existing HMGs.

Figure 1:
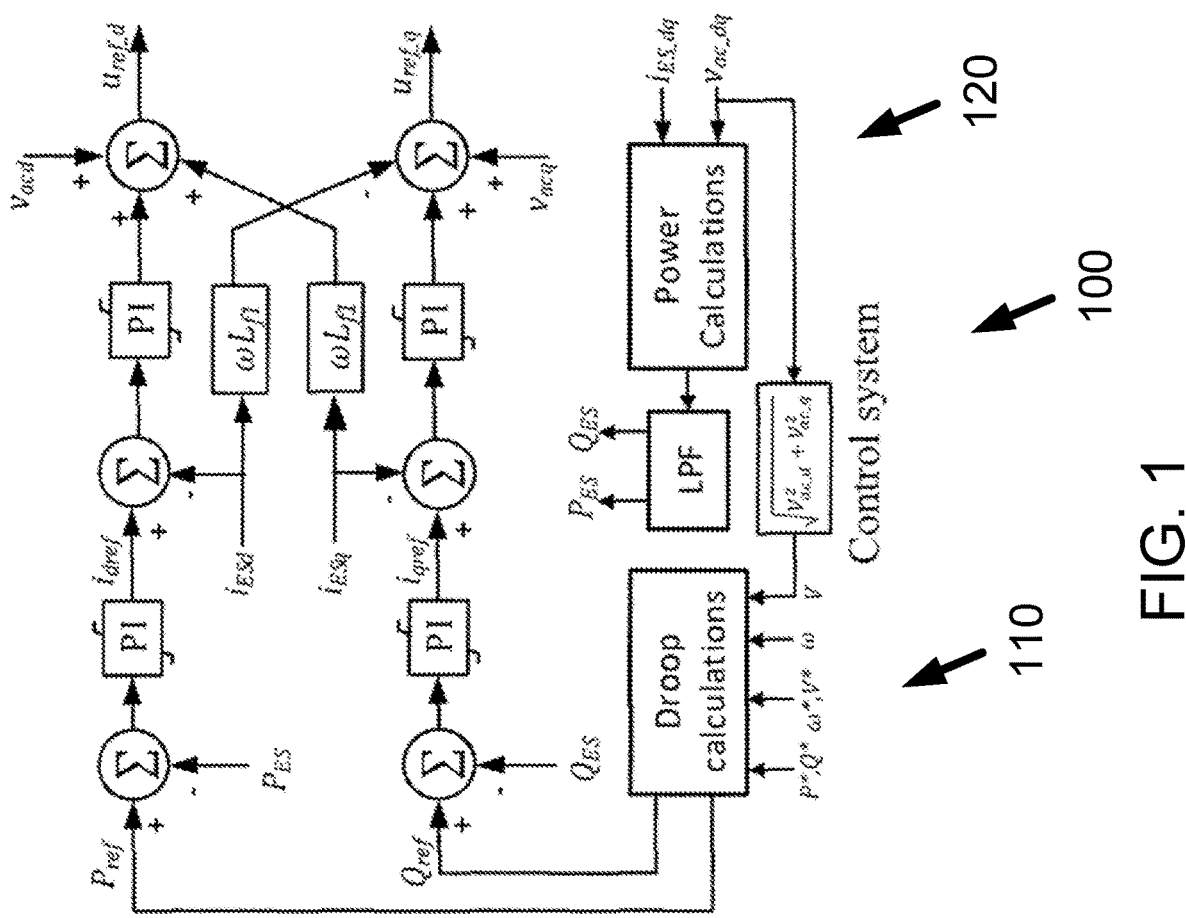
FIG. 1 shows a diagram of a control system for an AC BESS control block.
Figure 2:
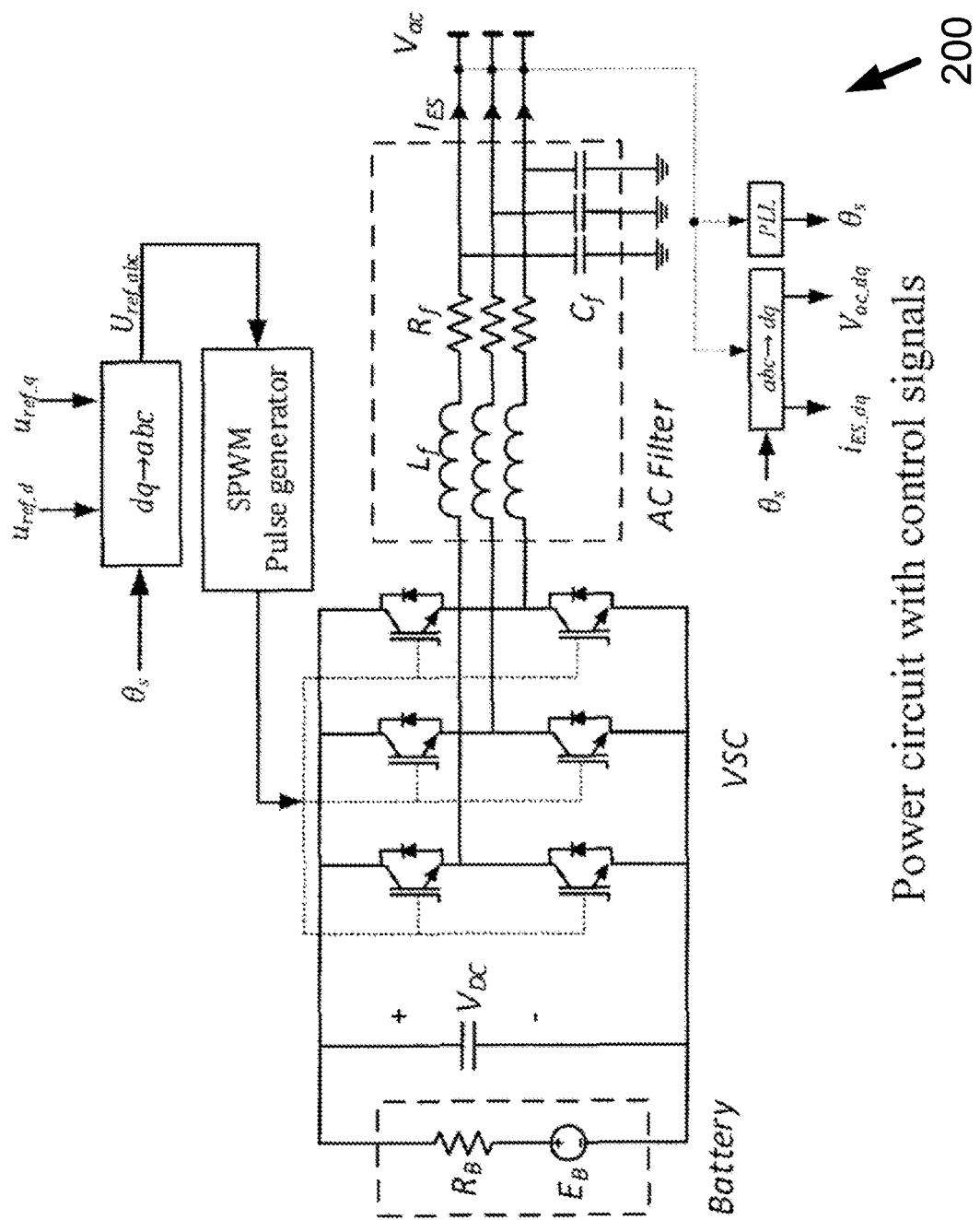
FIG. 2 shows a diagram of a power circuit with control signals for an AC BESS control block.

An example of a BESS control system 100 in accordance with the present invention is shown in FIG. 1. A BESS power circuit 200 with control signals is shown in FIG. 2. The system includes functionalities of both a droop based control method (a speed control mode used for AC electrical power generators whereby the power output of a generator reduces as the line frequency increases) and a grid-feeding strategy for an inverter interfaced energy storage system. In grid-feeding strategy, the BESS inverter is controlled to inject/absorb active/reactive powers. In this method, by good approximation it is assumed that the inverter output active and reactive power correspond independently to inverter frequency and voltage magnitude, respectively. Therefore, the BESS control system tracks the power references (P*, Q*) applied by the power management system. These references can be constant values defined by the system operator depending on the grid condition or power mismatches between load and generating resources.

The droop-based control 110 is obtained using P-ω and Q-V droops, where ω and V are AC sub-grid voltage and frequency, respectively. The power references are defined as below:

$$P_{ref} = P^* - m_p(\omega - \omega^*) \quad (1)$$

$$Q_{ref} = Q^* - n_q(V - V^*)$$

$$m_p \geq \frac{P_{max} - P_{min}}{\omega^*} \quad (2)$$

$$n_p \geq \frac{V_{max} - V_{min}}{V^*}$$

where * denotes rated set points, and $m_p$ and $n_q$ are droop gains for power sharing.

In order to enable the BESS to contribute in power fluctuation minimization during intermittent renewable generation, the active power reference is made equal to power balance mismatch:

$$P^* = P_{Lac} - [P_{DFJG} + P_{DG} + P_{IC}] \quad (3)$$

where $P_{Lac}$, $P_{DFJG}$, $P_{DG}$, and $P_{DG}$ represent the Total Load, DFIG, DG and IC output powers (P), respectively. In this way, the BESS absorbs/injects the amount of power mismatched between load and generation. The reactive power reference Q* depends on the grid voltage control and inverter maximum current limit. The BESS is usually used as an active power device to control the flow of energy. Therefore, Q* is made to be zero. Although the BESS inverter can appropriately be used as a static compensator, the reactive power absorption/injection will limit the active power capability of the inverter.

$P_{ES}$ and $Q_{ES}$ 120 are filtered output powers in FIG. 1, and p and q are respectively calculated unfiltered positive sequence output powers from measured signals.

$$P_{ES} = \frac{\omega_c}{s + \omega_c} p \quad (4)$$

$$Q_{ES} = \frac{\omega_c}{s + \omega_c} q$$

$$p = \frac{3}{2}[v_{acd} i_{ESd} + v_{acq} i_{ESq}] \quad (5)$$

$$q = \frac{3}{2}[v_{acq} i_{ESd} - v_{acd} i_{ESq}]$$

The present invention applies a dual loop decoupled control structure with the droop-based concept to recondition active and reactive reference powers. In this strategy, while the system tracks the applied power references, the droop block adaptively regulates references according to current operating conditions of microgrid voltage and frequency. In order to have an independent regulation over active and reactive powers, the control system is implemented in a Stationary Reference Frame (SRF) dq system, where d axis corresponds to active power control and q axis corresponds to reactive power control. In this way two axes are decoupled through the feedforward terms of $\omega L_f$ which is the output inductor's derivative voltage effect appearing when transforming from Natural Reference Frame (NRF) abc system to dq frame.

Proportional-Integral (PI) controllers are utilized to regulate power and current components. In order to design PI regulators coefficients (Kp, Ki), in several embodiments the system is linearized around an operating point that ensures the system stability for different operating conditions. It is noteworthy that the designed coefficient set remains unchanged during any type of disturbances. A question may arise about how one set of coefficients works for all three situations. PI parameters are tuned to have the best response in order to track the active and reactive power references in all situations. In these situations, power balances are affected by disturbances. So, the PIs are first designed for the worst case (that is the fault disturbance) and then fine-tuned to adapt to other disruptions.

Figure 3:
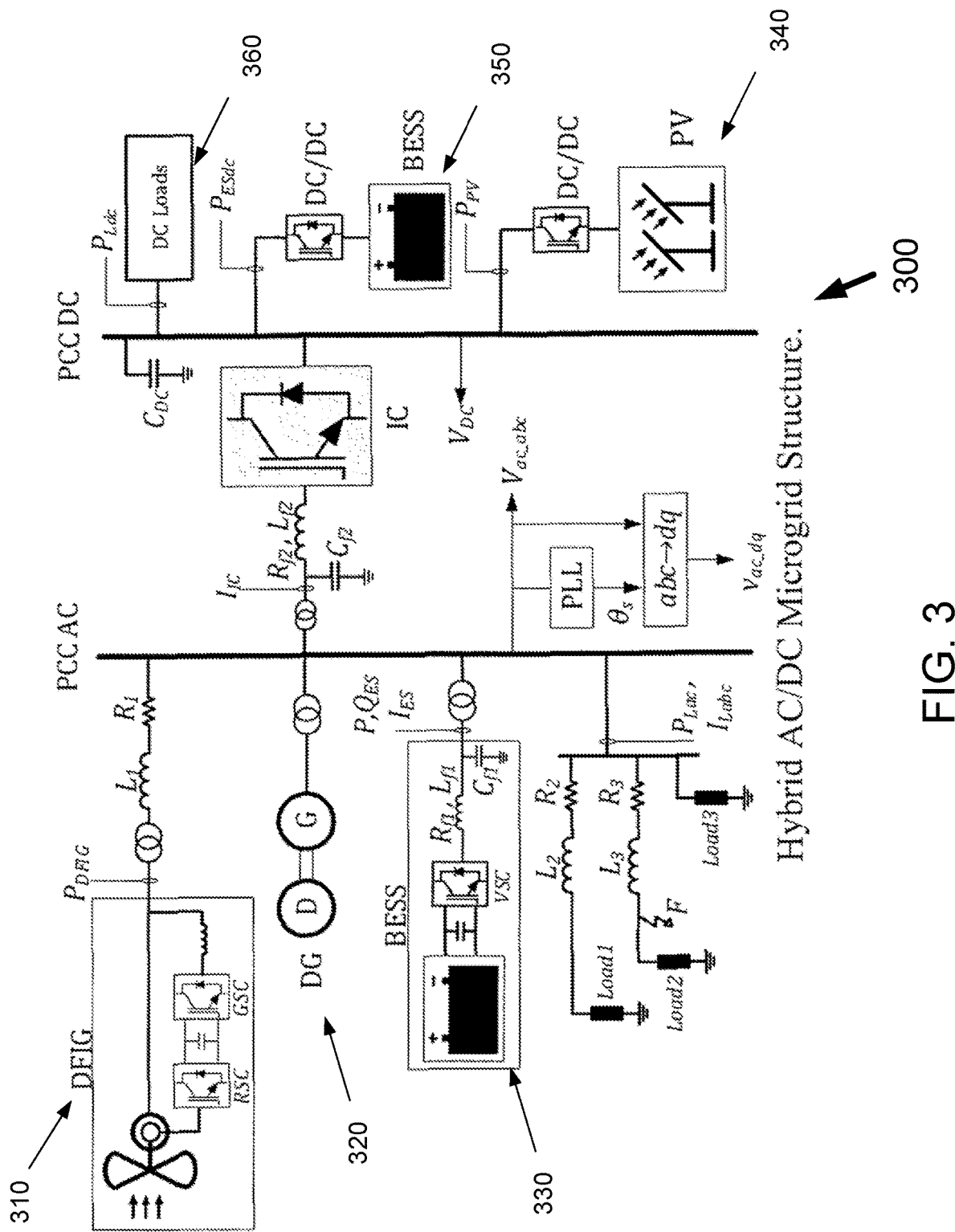
FIG. 3 shows a diagram of an exemplary embodiment of a hybrid AC/DC microgrid structure.

FIG. 3 shows an exemplary HMG system 300 in accordance with the present invention. The Medium Voltage (MV) AC sub-grid contains a Doubly Fed Induction Generator (DFIG) based variable speed wind generator 310 and a Diesel Generator (DG) 320, both connected at the point of common coupling (PCC). The wind-diesel generation system in AC sub-grid is collocated with a BESS 330 to provide peak shaving service during wind speed fluctuations and to enhance resiliency against large signal disturbances. The DC sub-grid comprises Photovoltaic (PV) solar panels 340, a peak shaving BESS 350 for mitigating solar irradiance fluctuations, and constant DC loads 360. FIG. 4 shows the various parameters of the HMG system, including the AC BESS and the DC BESS, used in this exemplary embodiment.

The HMG system of FIG. 3, as well as the complete control system, have been simulated in a MATLAB\Simulink environment with detailed switching models for all power electronic devices. The sample time for discrete time simulations is chosen as 5 µs. Therefore, with detailed modeling and very short sample time it is ensured that system dynamics and performance evaluation are reflected with highest accuracy.

Figure 5:
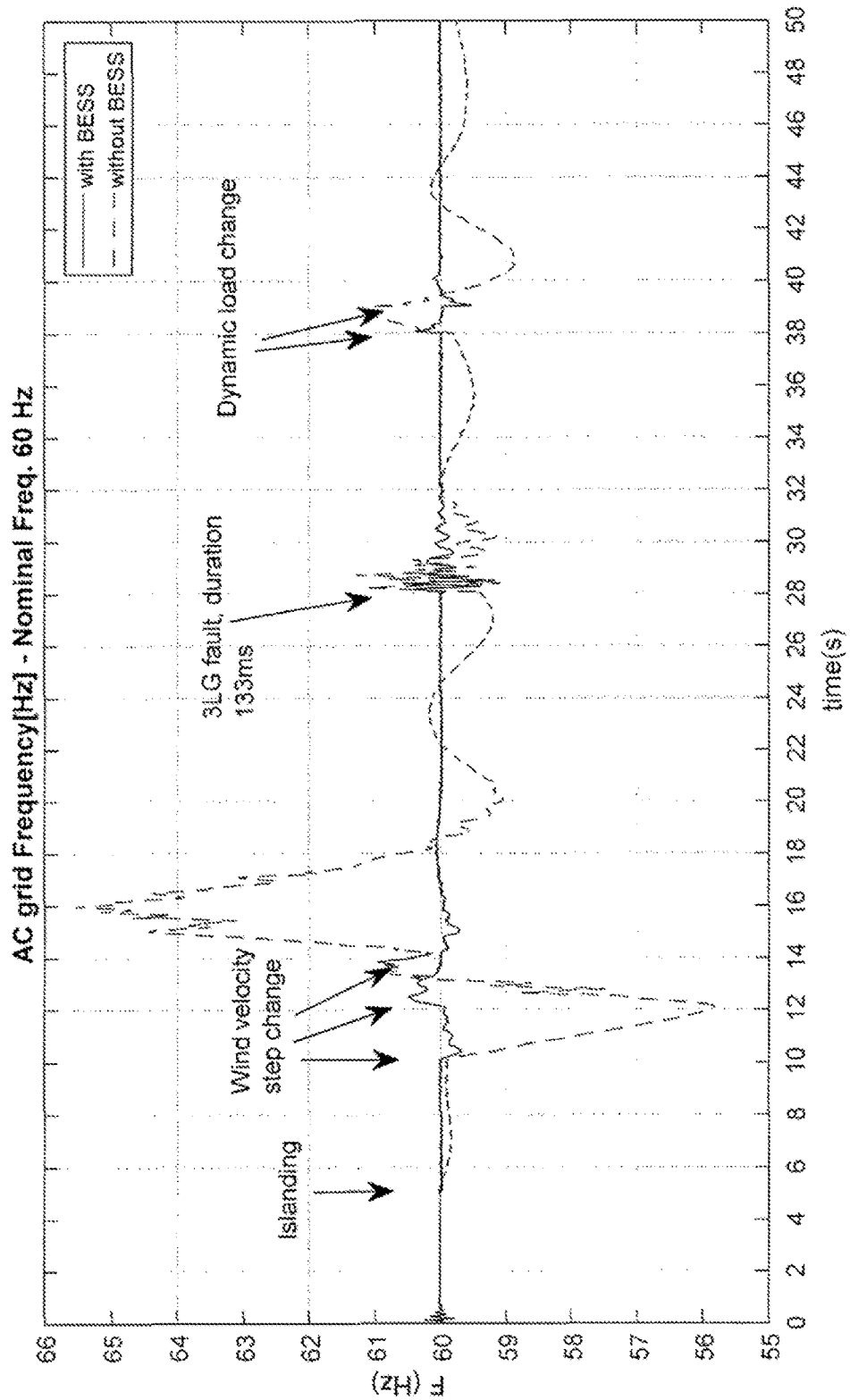
FIG. 5 shows AC sub-grid frequency for the system of FIG. 3.
Figure 6:
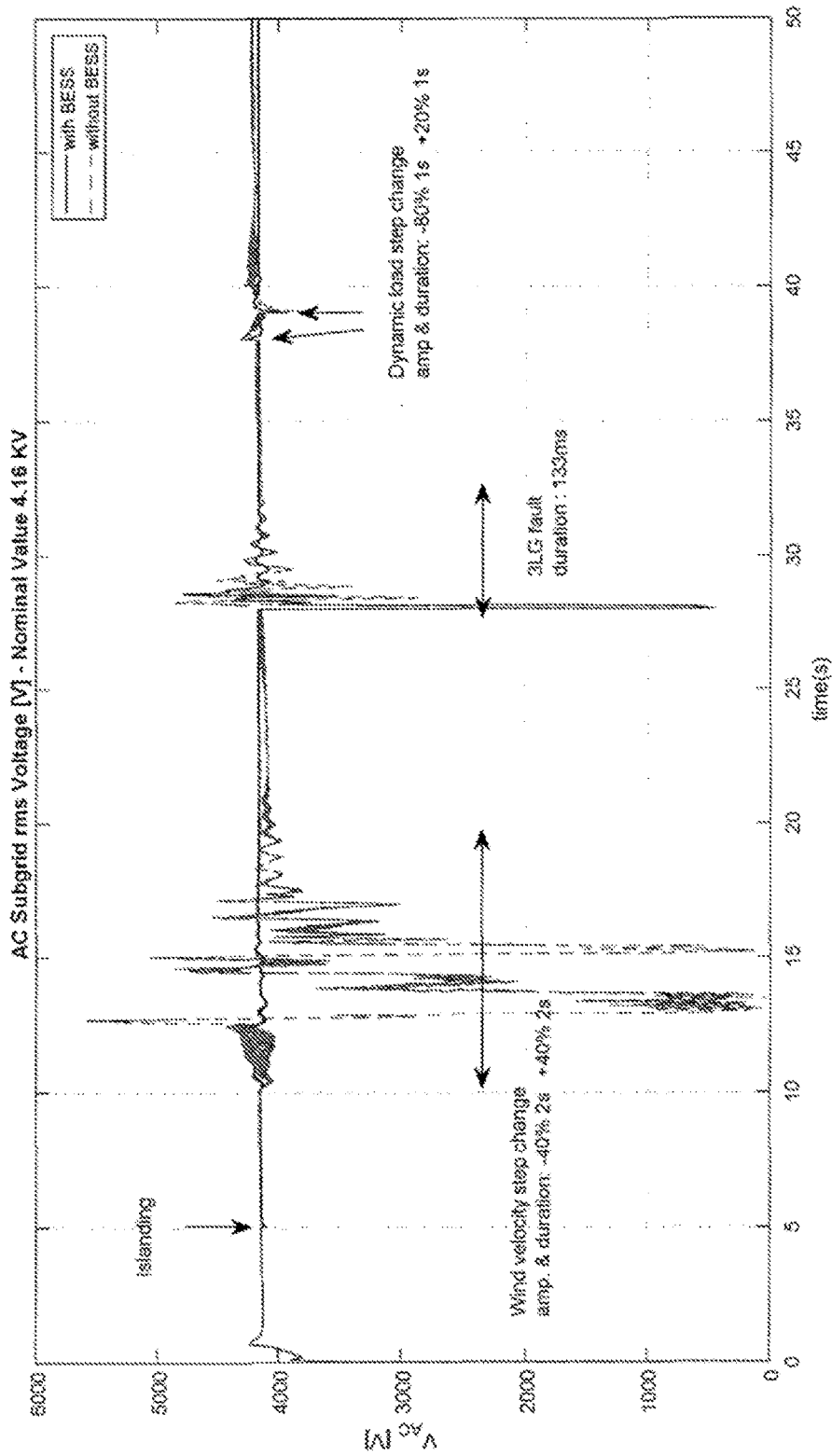
FIG. 6 shows AC subgrid voltage RMS value (phase A) for the system of FIG. 3.
Figure 7:
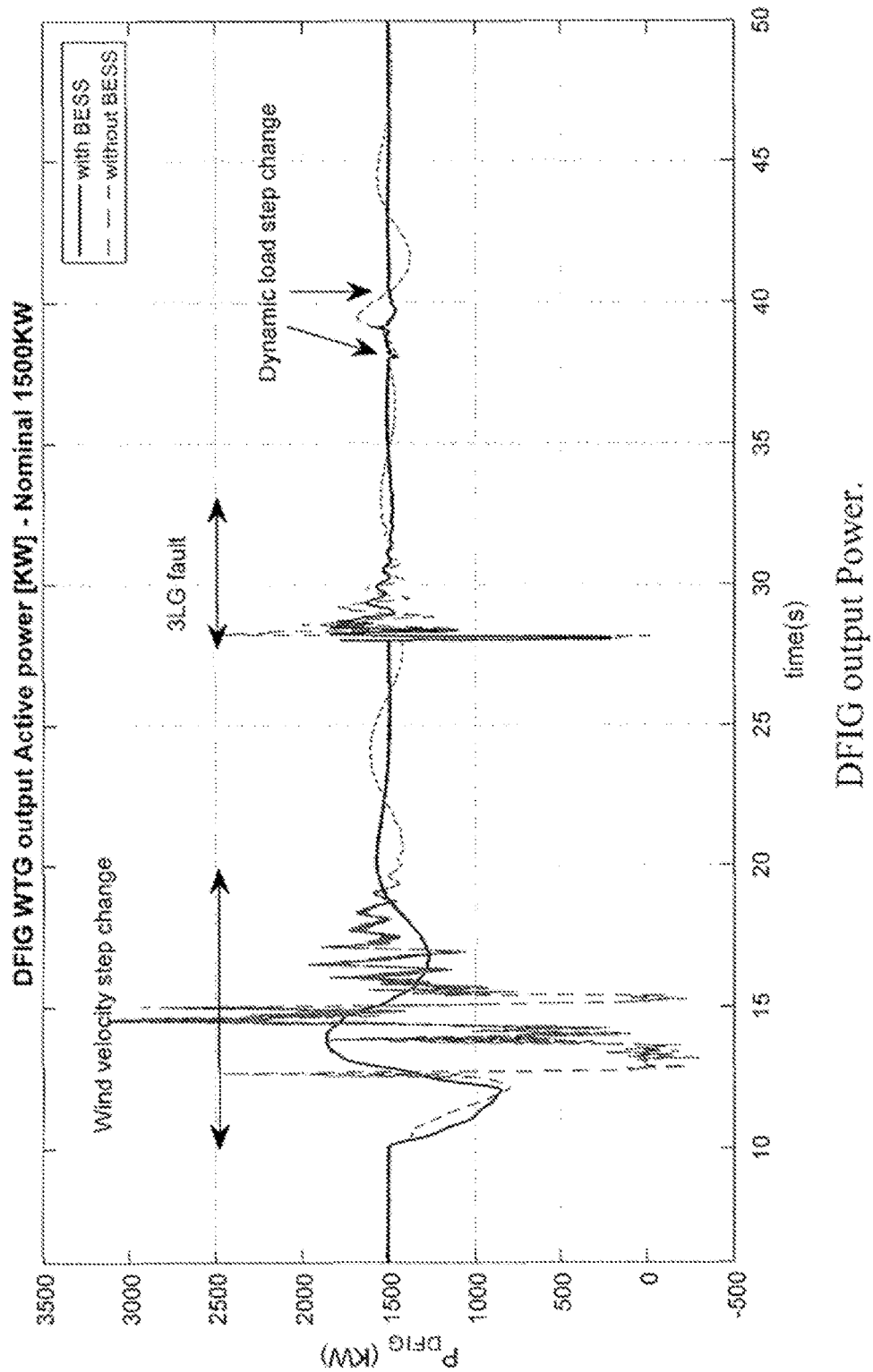
FIG. 7 shows DFIG output power for the system of FIG. 3.
Figure 8:
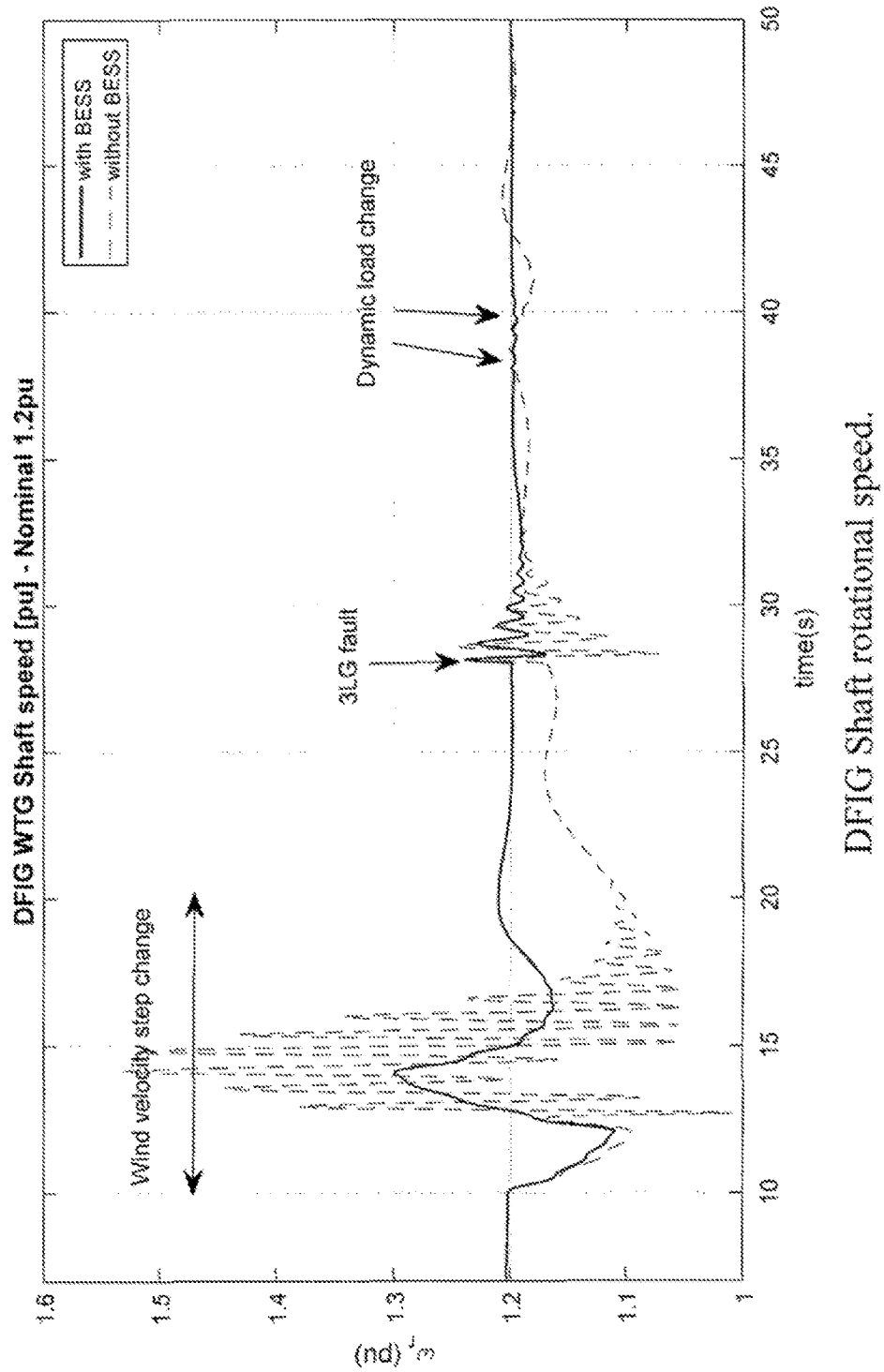
FIG. 8 shows DFIG shaft rotational speed for the system of FIG. 3.
Figure 9:
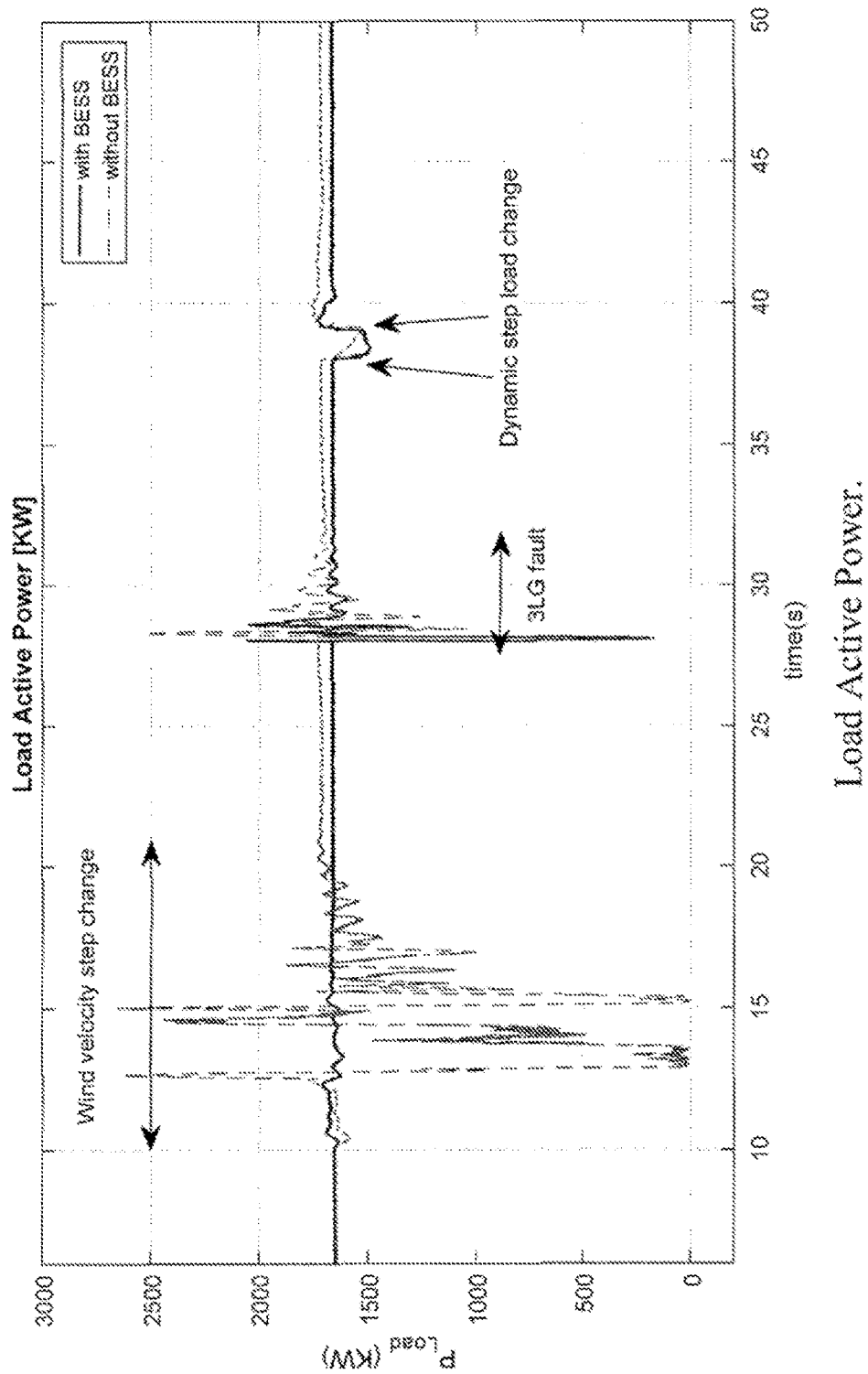
FIG. 9 shows Load active power for the system of FIG. 3.
Figure 10:
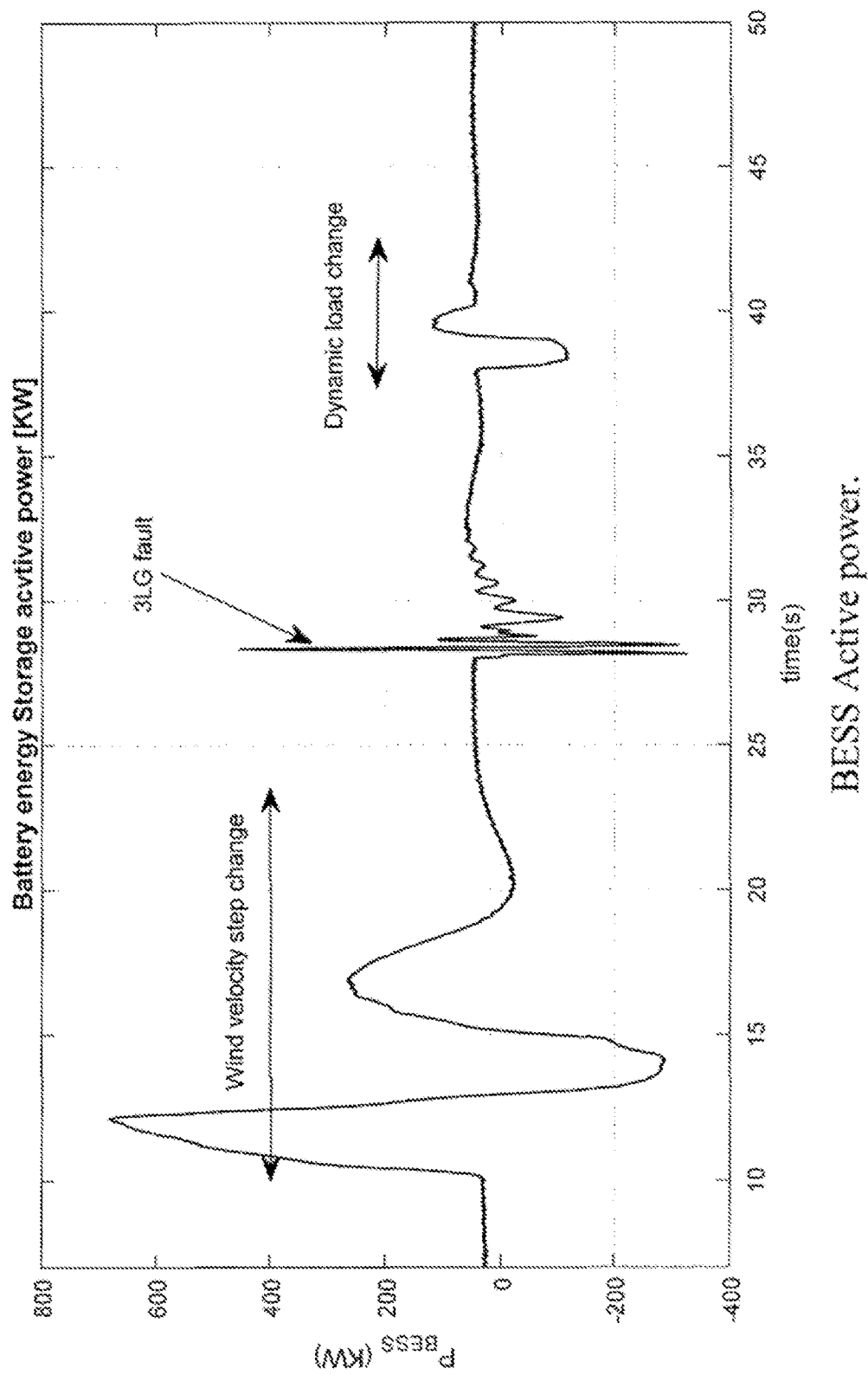
FIG. 10 shows BESS active power for the system of FIG. 3.

FIGS. 5-10 show the responses of various variables of the HMG system with and without the proposed BESS under three major disturbances as described below. FIG. 5 shows AC sub-grid frequency (F), FIG. 6 shows AC subgrid voltage RMS value (phase A), FIG. 7 shows DFIG output power, FIG. 8 shows DFIG shaft rotational speed, FIG. 9 shows load active power, and FIG. 10 shows BESS active power for the system of FIG. 3. From the responses, it has been shown that the proposed BESS can not only perform its typical function of minimization of frequency and power fluctuations during wind speed/solar irradiance change, but also can well maintain the transient stability and enhance the resiliency of the HMG system under fault condition as well as the load change situation. In other words, the BESS can effectively perform three functions in the HMG environment.

Disturbance 1—Wind speed variation: Intermittent wind velocity is simulated by two step changes. The nominal velocity is 14 m/s. A disturbance is simulated by wind velocity change to 60% and 140%, each for 2.0 sec duration, at the time of 10.0 sec and 12.0 sec, respectively.

Disturbance 2—Fault at AC sub-grid: A 100% three-line-to-ground (3LG) short circuit, which is considered as the severest fault in a power network, is applied at the location F in FIG. 3 at tf=28.0 sec for a duration of 133 ms (i.e., 8 cycles).

Disturbance 3—Dynamic load step change: A step change in dynamic load happens in AC subgrid for a duration of 2.0 sec. This load is a 205 KW variable induction motor that emulates a highly nonlinear and dynamic performance. The nominal mechanical torque of motor is 1100 N-m. A disturbance is simulated by a step change in mechanical torque to 20% and a step change to 120% of nominal torque, each for 1.0 sec duration, at the time of 38 sec and 39 sec, respectively.

The present invention comprises significant advantages over the prior art in that the BESS can be utilized for resiliency enhancement during large signal disturbances in an HMG system. In other words, the BESS can maintain the transient stability during any fault conditions as well as any load change situations, in addition to its typical function of minimization of frequency and power fluctuations during wind speed/solar irradiance change. The BESS thus is used to improve the resiliency of the HMG, resulting in a savings from foregoing the cost of putting auxiliary devices in during fault conditions and load change situations.

Some aspects of a system in accordance with the present invention may be controlled through computer-implemented systems, hardware, and programs. In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An improved battery energy storage system for a hybrid microgrid system, comprising:
    a hybrid AC/DC microgrid comprising an AC sub-grid and a DC sub-grid, said AC sub-grid comprising a variable speed wind generator and a diesel generator, and said DC sub-grid comprising an array of photovoltaic solar panels;
    a triple function battery energy storage system connected via a bi-directional inverter to the AC sub-grid or the DC sub-grid, the inverter controlled to transfer power between the battery energy storage system to the AC sub-grid or the DC sub-grid by a controller providing switch control signals to the inverter and one or more of said variable speed wind generator, diesel generator, and array of photovoltaic solar panels, said triple function battery energy storage system comprising a dual loop decoupled control system implementing a droop-based control method and a grid-feeding strategy;
    wherein said control system is implemented in a Stationary Reference Frame dq system, where d axis corresponds to active power control and q axis corresponds to reactive power control;
    wherein the droop-based control method uses P-ω and Q-V droops, where ω is the AC sub-grid voltage, V is the AC sub-grid frequency, P is active power, and Q is reactive power;
    wherein the control system is configured to control the active power and reactive power absorbed and injected by the inverter with the hybrid AC/DC microgrid to track droop adjusted active power reference, $P_{ref}$, and droop adjusted reactive power reference, $Q_{ref}$, respectively, defined as:

$$P_{ref} = P^* - m_p(\omega - \omega^*)$$

$$Q_{ref} = Q^* - n_q(V - V^*)$$

$$m_p \geq \frac{P_{max} - P_{min}}{\omega^*}$$

$$n_p \geq \frac{V_{max} - V_{min}}{V^*}$$

wherein $P^*$ is a received active power reference value, $Q^*$ is a received reactive power reference value, $\omega^*$ is a voltage rated set point of the AC sub-grid, $V^*$ is a frequency rated set point of the AC sub-grid, $P_{max}$ is a maximum active power value, $P_{min}$ is a minimum active power value, $V_{max}$ is a maximum AC sub-grid frequency value, $V_{min}$ is a minimum AC sub-grid frequency value, and $m_p$ and $n_q$ are droop gains for power sharing,
    wherein said control system is adapted to control the inverter output to track the droop adjusted active and reactive power references in order to maintain transient stability during any fault condition in the hybrid AC/DC microgrid and during a change in load in the hybrid AC/DC microgrid;
    wherein said control system is adapted to reduce frequency fluctuations and power fluctuations in the hybrid AC/DC microgrid during a change in wind speed or solar irradiance by setting the active power reference value, $P^*$, equal to a power balance mismatch calculated by subtracting a total amount of power supplied to the hybrid AC/DC microgrid from a total load power drawn from the hybrid AC/DC microgrid, and setting the reactive power reference value, $Q^*$, equal to zero, to thereby control the battery energy storage system inverter to absorb or inject the amount of power balance mismatch between load and generation; and
    further wherein the hybrid AC/DC microgrid does not include a series dynamic braking resistor (SDBR) or a fault current limiter.

2. The improved battery energy storage system of claim 1, wherein the triple-function battery energy storage system is configured as an active power device to control the flow of energy in the hybrid microgrid.

3. The improved battery energy storage system of claim 2, wherein $Q^*$ is zero.

4. The improved battery energy storage system of claim 1, wherein the active and reactive power references are constant values set based on the hybrid AC/DC microgrid condition or power mismatches between load and generating resources coupled to the hybrid AC/DC microgrid.

5. The improved battery energy storage system of claim 1, wherein the control system further comprises proportional-integer (PI) controllers.

6. The improved battery energy storage system of claim 5, wherein the PI controllers operate based on a set of PI regulator coefficients: Kp, Ki.

7. The improved battery energy storage system of claim 6, wherein the set of PI regulator coefficients remains constant during any type of disturbance to the hybrid AC/DC microgrid.

\* \* \* \* \*